US 10,830,193 B2

(12) United States Patent
Enami et al.

(10) Patent No.: US 10,830,193 B2
(45) Date of Patent: *Nov. 10, 2020

(54) INTAKE MANIFOLD FOR ENGINE

(71) Applicant: HONDA MOTOR CO., LTD., Tokyo (JP)

(72) Inventors: Masatatsu Enami, Wako (JP); Takeshi Honda, Wako (JP); Yasushi Matsuura, Wako (JP); Mikio Hara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/533,220

(22) Filed: Aug. 6, 2019

(65) Prior Publication Data

US 2020/0049111 A1 Feb. 13, 2020

(30) Foreign Application Priority Data

Aug. 8, 2018 (JP) .................................. 2018-149125

(51) Int. Cl.
*F02M 35/00* (2006.01)
*F02M 35/116* (2006.01)
*F02M 35/10* (2006.01)

(52) U.S. Cl.
CPC .... *F02M 35/116* (2013.01); *F02M 35/10059* (2013.01); *F02M 35/10222* (2013.01)

(58) Field of Classification Search
CPC ....... F02M 35/10222; F02M 35/10059; F02M 35/116

See application file for complete search history.

(56) References Cited

U.S. PATENT DOCUMENTS 4,201,165 A * 5/1980 Tanaka .................... F02B 31/00
                                                                      123/308
4,221,203 A * 9/1980 Hayashi ................. F02M 26/55
                                                                     123/568.29

(Continued)

FOREIGN PATENT DOCUMENTS

JP      2017-128794 A      7/2017
JP       2020-23930 A      2/2020

OTHER PUBLICATIONS

Notice of Same Date Filing of Equivalent Application by Same Applicant dated Jan. 15, 2020, issued in counterpart JP application No. 2018-149125, with English translation. (2 pages).

*Primary Examiner* — Phutthiwat Wongwian
*Assistant Examiner* — Sherman D Manley
(74) *Attorney, Agent, or Firm* — Westerman, Hattori, Daniels & Adrian, LLP

(57) ABSTRACT

An intake manifold 10 includes: a blowby gas introduction port 16g that is configured to introduce blowby gas into a PCV chamber 15; a blowby gas exhaust port 16f that is configured to discharge the blowby gas from the PCV chamber 15 into a surge tank 11; and a drain hole 17c that is configured to discharge water contained in the blowby gas, from the PCV chamber 15 into the surge tank 11. A bottom wall 17d of the surge tank 11 includes protruding parts 17e, 17f that protrude upward, the blowby gas exhaust port 16f is located upstream of the most upstream side protruding part 17e located on the most upstream side, and the drain hole 17c is located downstream of the most upstream side protruding part.

2 Claims, 4 Drawing Sheets

(56) References Cited

U.S. PATENT DOCUMENTS

| | | | | |
|---|---|---|---|---|
| 4,367,719 A * | 1/1983 | Kimura | F02M 26/15 | 123/184.41 |
| 4,741,295 A * | 5/1988 | Hosoya | F02M 26/17 | 123/184.31 |
| 7,198,040 B2 * | 4/2007 | Noda | F02M 35/10354 | 123/572 |
| 10,215,138 B2 * | 2/2019 | Newman | F02M 35/10222 | |
| 2004/0261745 A1 * | 12/2004 | Kito | F02D 9/1095 | 123/184.42 |
| 2010/0077995 A1 * | 4/2010 | Buia | F02B 29/0468 | 123/542 |
| 2010/0242931 A1 * | 9/2010 | Huff | F02M 25/06 | 123/574 |
| 2011/0232598 A1 * | 9/2011 | Harada | F02M 35/10222 | 123/184.47 |
| 2012/0021179 A1 * | 1/2012 | Ohta | B29C 66/124 | 428/156 |
| 2012/0132158 A1 * | 5/2012 | Park | F02M 25/06 | 123/41.86 |
| 2013/0125851 A1 * | 5/2013 | Miyashita | F02M 35/10321 | 123/184.21 |
| 2014/0326226 A1 * | 11/2014 | Senda | F01M 13/00 | 123/573 |
| 2015/0167515 A1 * | 6/2015 | Nomura | F01M 13/04 | 123/573 |
| 2015/0300223 A1 * | 10/2015 | Bailey, III | F01M 13/0405 | 123/573 |
| 2015/0322867 A1 * | 11/2015 | Ito | F02D 9/104 | 123/184.21 |
| 2016/0201620 A1 * | 7/2016 | Yano | F02M 35/10078 | 123/184.27 |
| 2018/0058398 A1 * | 3/2018 | Newman | F02M 35/10222 | |
| 2018/0274411 A1 * | 9/2018 | Gopalan | F02M 35/10222 | |
| 2018/0372039 A1 * | 12/2018 | Sakurai | F02M 35/10111 | |
| 2019/0226369 A1 * | 7/2019 | Xu | F02B 77/08 | |
| 2020/0049039 A1 * | 2/2020 | Enami | F02M 35/10222 | |

* cited by examiner

DOWNSTREAM SIDE ←————→ UPSTREAM SIDE

DOWNSTREAM SIDE ←————→ UPSTREAM SIDE

HORIZONTAL DIRECTION

INTAKE MANIFOLD FOR ENGINE

CROSS-REFERENCE OF RELATED APPLICATION

This application claims priority of Japanese Patent Application No. 2018-149125 filed in Japan on Aug. 8, 2018, the entire contents of which are incorporated herein by reference.

TECHNICAL FIELD

The present invention relates to an intake manifold for an engine including: a surge tank that is connected on its upstream side to a throttle valve; multiple branch pipes that are arranged side by side in a longitudinal direction of the surge tank and respectively connected to cylinders; and a PCV chamber that is provided upstream of a central part in the longitudinal direction of the surge tank.

BACKGROUND OF THE INVENTION

The applicant of the present application has proposed such an intake manifold for an engine in Japanese Patent Application No. 2017-128794. Intake gas flows in the surge tank of the intake manifold from the upstream side, which is connected to the throttle valve, to the downstream side. Thus, if the PCV chamber is provided on the downstream side of the surge tank (on the side away from the throttle valve), blowby gas discharged from the PCV chamber to the surge tank is easily fed to the branch pipes on the downstream side of the surge tank whereas it is not easily fed to the branch pipes on the upstream side of the surge tank, which poses a problem that the amounts of blowby gas to be fed to the branch pipes may become uneven.

To address this problem, in the intake manifold for an engine having been proposed in Japanese Patent Application No. 2017-128794, the PCV chamber is disposed upstream of the central part of the surge tank in the longitudinal direction thereof, whereby blowby gas is distributed to the branch pipes evenly.

SUMMARY OF INVENTION

Meanwhile, water separated from blowby gas in the PCV chamber is discharged to the surge tank through the drain hole and is fed to cylinders for combustion through the branch pipes together with intake gas. However, if the PCV chamber is provided on the upstream side of the surge tank which is close to the throttle valve as described above, especially in a cold region, the water discharged into the surge tank flows backward to the throttle valve side, which may freeze the throttle valve and hamper smooth operation.

There is a need to provide an intake manifold for an engine capable of preventing water contained in blowby gas from flowing backward to the throttle valve side while supplying the blowby gas to branch pipes evenly.

In a first embodiment of the present invention, an intake manifold for an engine includes: a surge tank that is connected on an upstream side thereof to a throttle valve; multiple branch pipes that are arranged side by side in a longitudinal direction of the surge tank and respectively connected to cylinders; and a PCV chamber that is provided upstream of a central part in the longitudinal direction of the surge tank, the intake manifold for an engine being characterized in that the intake manifold includes: a blowby gas introduction port that is designed to introduce blowby gas into the PCV chamber; a blowby gas exhaust port that is designed to discharge the blowby gas from the PCV chamber into the surge tank; and a drain hole that is designed to discharge water, contained in the blowby gas, from the PCV chamber into the surge tank, a bottom wall of the surge tank includes at least one protruding part that protrudes upward, and the blowby gas exhaust port is located upstream of the most upstream protruding part located on the most upstream side, and the drain hole is located downstream of the most upstream protruding part.

Further, in a second embodiment of the present invention, the intake manifold for an engine is configured such that, in addition to the configuration of the first embodiment, the blowby gas exhaust port is located at a position higher than the blowby gas introduction port.

Effect of the Invention

According to the configuration of the first embodiment, the intake manifold for an engine includes: the surge tank that is connected on the upstream side thereof to the throttle valve; the multiple branch pipes that are arranged side by side in the longitudinal direction of the surge tank and respectively connected to the cylinders; and the PCV chamber that is provided upstream of the central part in the longitudinal direction of the surge tank. Thereby, it is possible to distribute blowby gas, discharged from the PCV chamber to the surge tank, to the branch pipes evenly.

The intake manifold includes: the blowby gas introduction port that is designed to introduce blowby gas into the PCV chamber; the blowby gas exhaust port that is designed to discharge the blowby gas from the PCV chamber into the surge tank; and the drain hole that is designed to discharge water, contained in the blowby gas, from the PCV chamber into the surge tank, the bottom wall of the surge tank includes at least one protruding part that protrudes upward, and the blowby gas exhaust port is located upstream of the most upstream protruding part located on the most upstream side, and the drain hole is located downstream of the most upstream protruding part. Thus, by introducing blowby gas and water to swirling currents that flow in directions opposed to each other about the most upstream protruding part, it is possible to distribute blowby gas to the branch pipes further evenly and prevent the throttle valve from getting wet at the same time.

In addition, according to the configuration of the second embodiment, the blowby gas exhaust port is located at a position higher than the blowby gas introduction port. Thus, since the blowby gas exhaust port is located at a position, this prevents water in the PCV chamber 15 from being dragged by blowby gas and scattered into the surge tank and thereby prevents the throttle valve from getting wet further reliably.

DETAILED DESCRIPTION OF EMBODIMENTS OF THE INVENTION

Hereinbelow, an embodiment of the present invention is described based on FIGS. 1 to 4.

Figure 1:
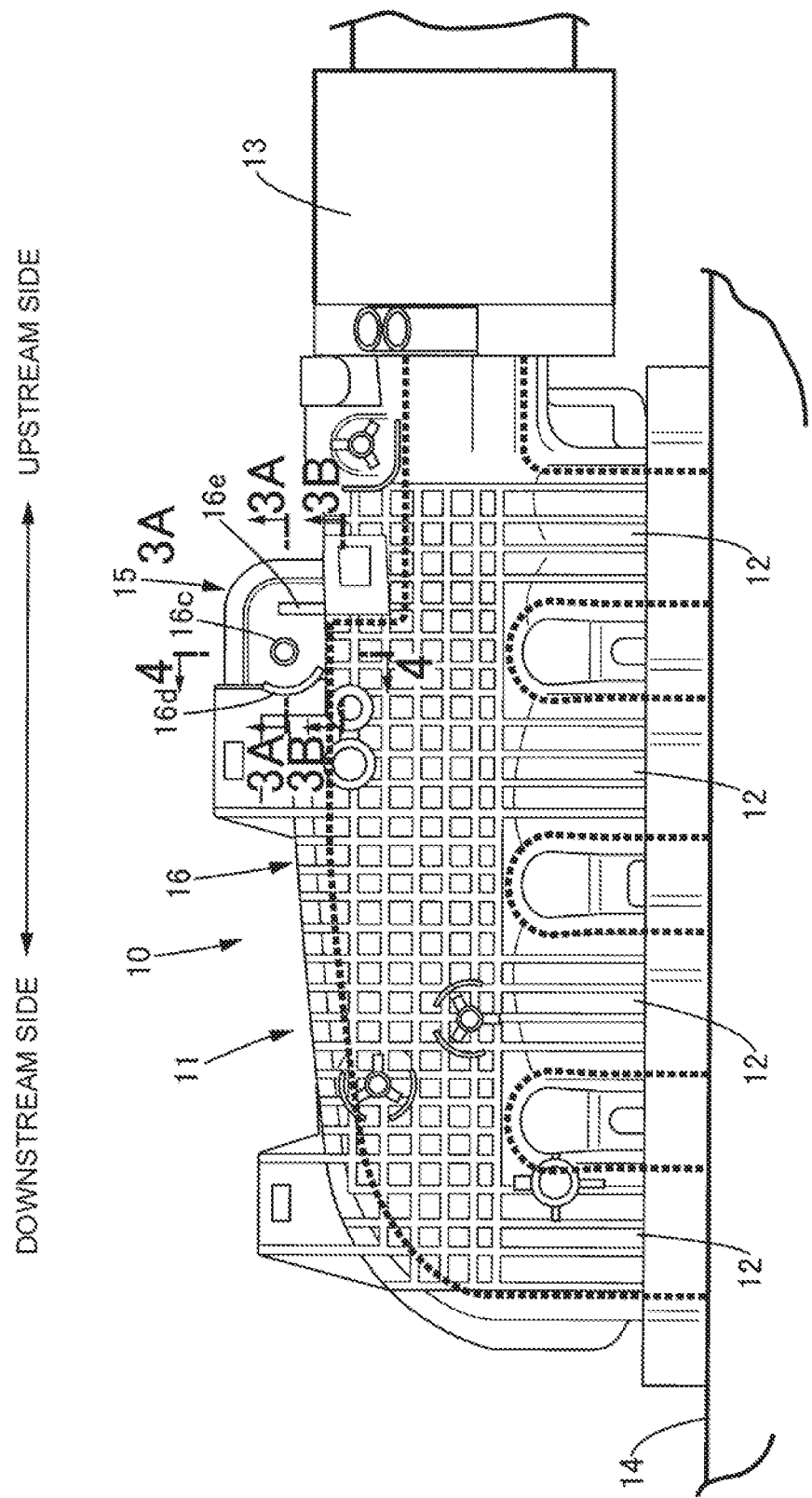
FIG. 1 is a plan view of an intake manifold.

As illustrated in FIG. 1, an intake manifold 10 for an inline four-cylinder engine includes: a surge tank 11 that extends in the longitudinal direction thereof; and four branch pipes 12 that branch from the surge tank 11 at four points thereof spaced from each other at predetermined intervals in the longitudinal direction thereof, a throttle valve 13 is connected to the surge tank 11 on the upstream side thereof, and outlet parts of the respective branch pipes 12 are coupled to a cylinder head 14 of the engine. A PCV (Positive Crankcase Ventilation) chamber 15 is provided to the surge tank 11 at a position upstream of a central part in the longitudinal direction thereof, more specifically, between the first branch pipe 12 and the second branch pipe 12 in order from the upstream side of the surge tank 11.

Figure 2:
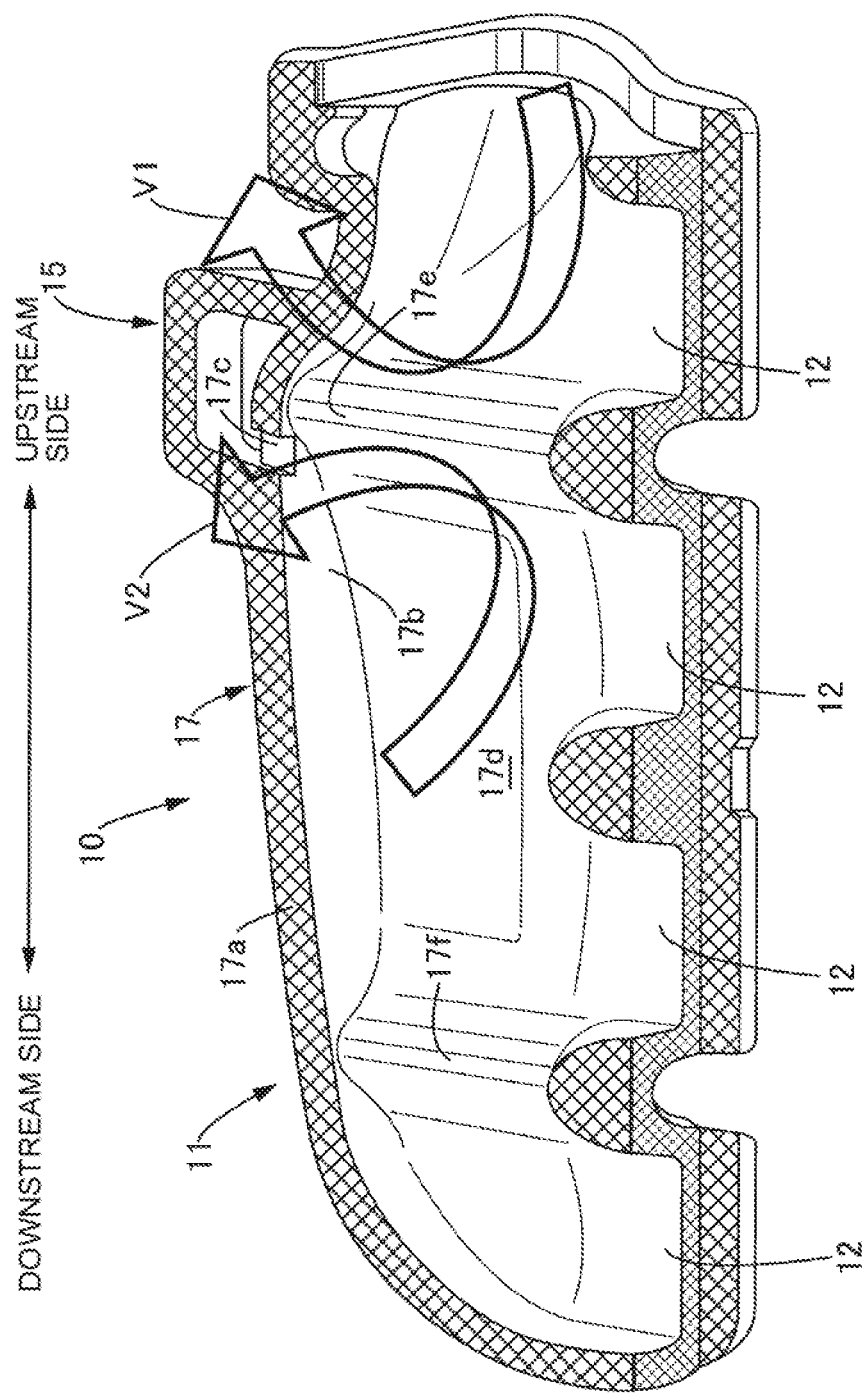
FIG. 2 is a perspective view of a lower member of the intake manifold.
Figure 3A:
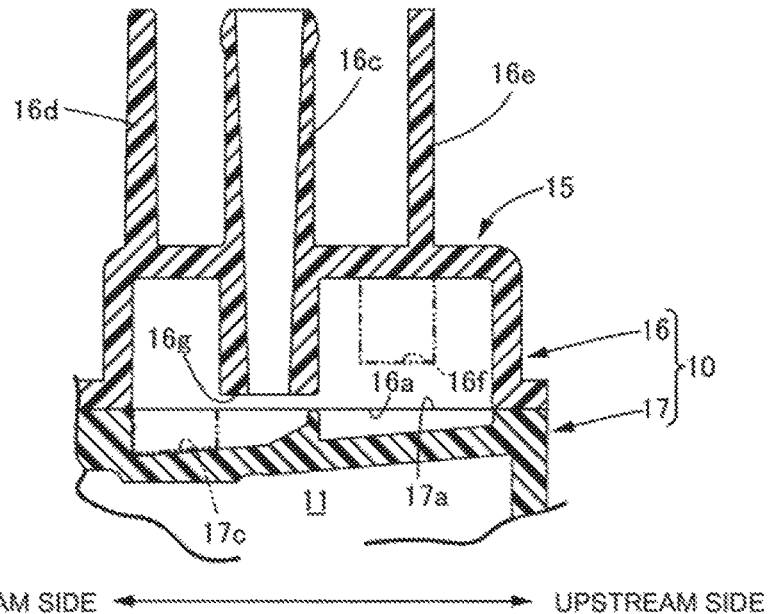
FIGS. 3A and 3B are sectional views taken along line 3A-3A and line 3B-3B of FIG. 1.
Figure 3B:
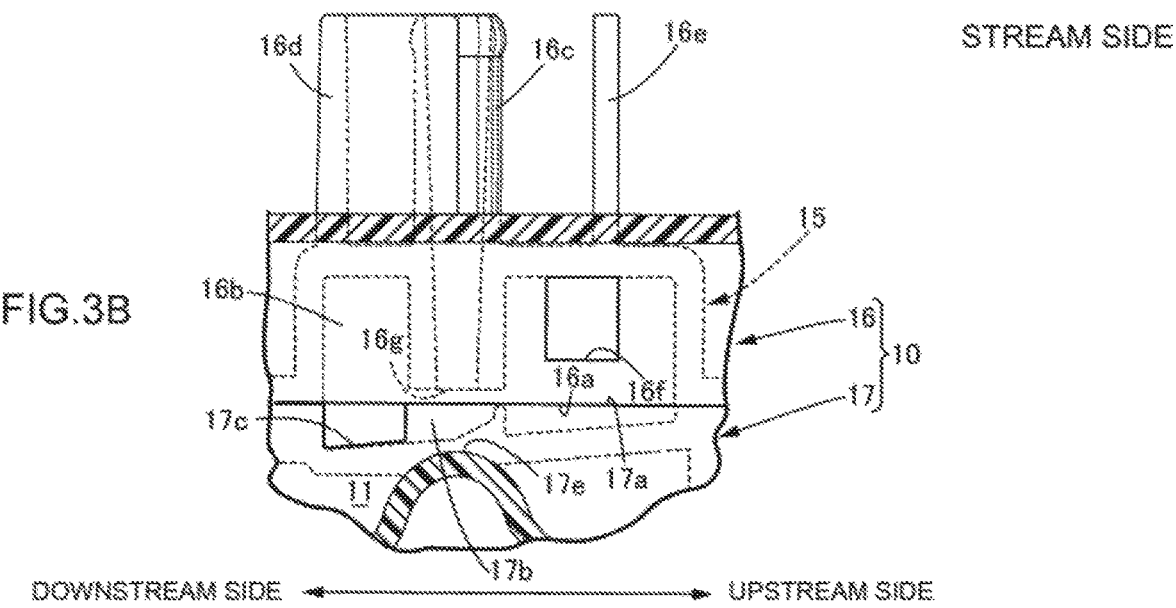
Figure 4:
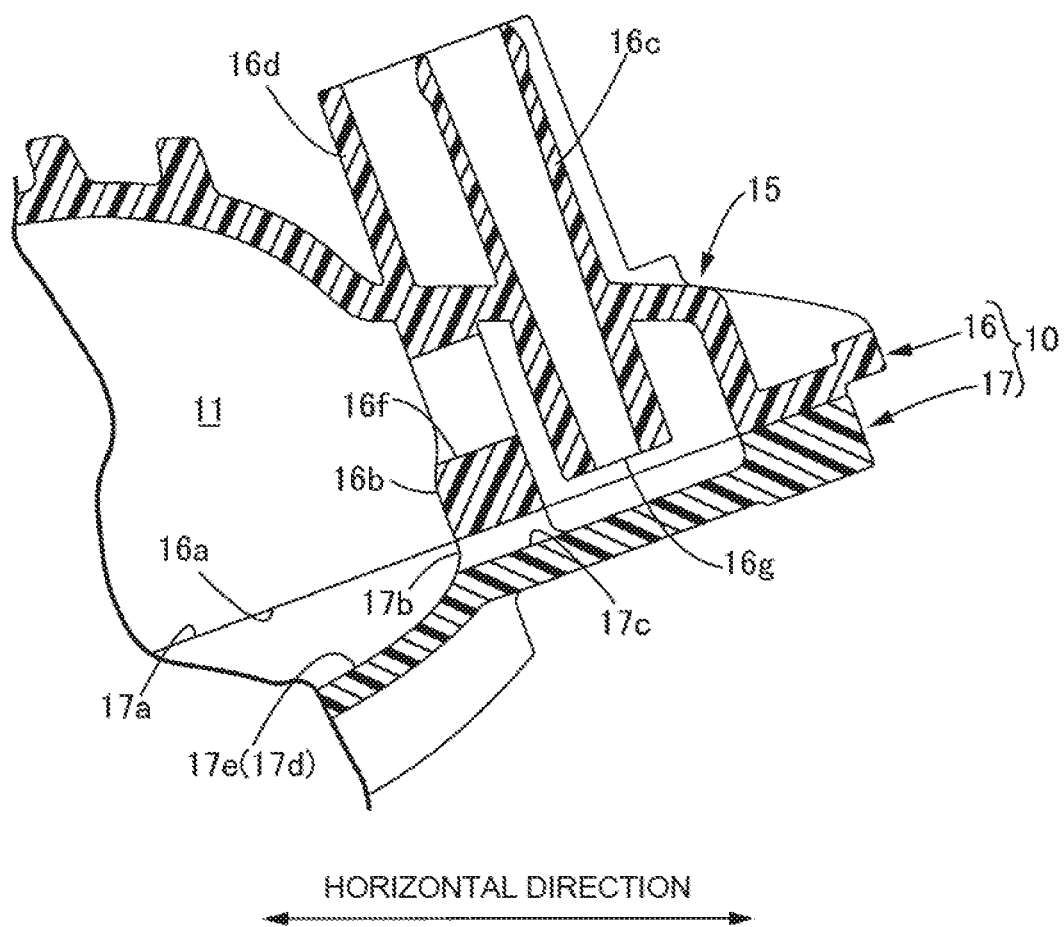
FIG. 4 is a sectional view taken along line 4-4 of FIG. 1.

As is clear by referring also to FIGS. 2 to 4, the intake manifold 10 is made by coupling split faces 16a, 17a of an upper member 16 and a lower member 17 made of synthetic resin by welding (see a hatched part of FIG. 2), and the surge tank 11, the branch pipes 12, and the PCV chamber 15 are formed so as to extend across the upper member 16 and the lower member 17.

The internal space of the PCV chamber 15 that is formed to bulge outward from an outer wall of the surge tank 11 is partitioned from the internal space of the surge tank 11 by partition walls 16b, 17b that are formed in the upper member 16 and the lower member 17. A pipe-shaped PCV joint 16c that communicates with the internal space of the PCV chamber 15 and two protective walls 16d, 16e that surround the PCV joint 16c to protect it against the damage caused by contact with another object are arranged on an upper face of the upper member 16.

The intake manifold 10 slants in such a manner as to be higher on the PCV chamber 15 side and lower on the branch pipe 12 side (see FIG. 4), and a blowby gas exhaust port 16f and a drain hole 17c are formed in the partition walls 16b, 17b that partition the surge tank 11 and the PCV chamber 15 from each other. The blowby gas exhaust port 16f is formed so as to penetrate the partition wall 16b of the upper member 16 to allow the internal space of the PCV chamber 15 to communicate with the internal space of the surge tank 11. The drain hole 17c is formed by notching the partition wall 17b at the split face 17a of the lower member 17 to allow the internal space of the PCV chamber 15 to communicate with the internal space of the surge tank 11.

The blowby gas exhaust port 16f is provided at a position higher than a blowby gas introduction port 16g that is located at the downstream end of the PCV joint 16c designed to introduce blowby gas into the internal space of the PCV chamber 15, and higher than the drain hole 17c.

Two protruding parts 17e, 17f (see FIG. 2) that extend in a direction orthogonal to the longitudinal direction are formed in a bottom wall 17d of the lower member 17 constituting a bottom wall of the surge tank 11. These protruding parts 17e, 17f are made in order to prevent a tool for manipulating bolts from interfering with the intake manifold 10 when the intake manifold 10 is fastened to the cylinder head 14 with the bolts, for example. The PCV chamber 15 is located so as to face the most upstream protruding part 17e (see FIG. 3B and FIG. 4) of the two protruding parts 17e, 17f which is located on the upstream side of the surge tank 11, and the blowby gas exhaust port 16f opens upstream of the most upstream protruding part 17e whereas the drain hole 17c opens downstream of the most upstream protruding part 17e (see FIG. 3B).

Next, an operation of the embodiment of the present invention having the above configuration is described.

With the operation of the engine, fuel-air mixture fed to a combustion chamber partially passes through the clearance between the piston and the cylinder, and thus becomes blowby gas containing fuel vapor and oil mist and retains in a crankcase. During the operation of the engine, since intake negative pressure of the engine acts on the inside of the intake manifold 10 located downstream of the throttle valve 13, a PCV valve constituted of a check valve opens, whereby the blowby gas in the crankcase is introduced into the internal space of the PCV chamber 15 through the blowby gas introduction port 16g of the PCV joint 16c and fed to the surge tank 11 of the intake manifold 10 after passing through the blowby gas exhaust port 16f.

Intake gas flows in the surge tank 11 of the intake manifold 10 from the upstream side, which is connected to the throttle valve 13, to the downstream side. Thus, if the PCV chamber 15 is provided on the downstream side of the surge tank 11, blowby gas fed from the PCV chamber 15 to the surge tank 11 is easily fed to the branch pipes 12 on the downstream side of the surge tank 11 whereas it is not easily fed to the branch pipes 12 on the upstream side of the surge tank 11, which poses a problem that the amounts of blowby gas to be fed to the cylinders may become uneven.

However, according to this embodiment, since the PCV chamber 15 is provided upstream of the central part in the longitudinal direction of the surge tank 11, specifically provided between the first branch pipe 12 and the second branch pipe 12 in order from the upstream side of the surge tank, it is possible to distribute blowby gas, discharged from the PCV chamber 15, evenly to the three branch pipes 12 located downstream of the PCV chamber 15. In addition, by the most upstream protruding part 17e formed in the bottom wall 17d of the surge tank 11, a swirling current V1 (see FIG. 2) occurs in the flow of intake gas located in a part upstream of the most upstream protruding part 17e, whereby blowby gas output through the blowby gas exhaust port 16f partially flows backward to the upstream side by the swirling current V1 and is actively fed to the most upstream side branch pipe 12. Thereby, it is possible to distribute blowby gas to the four branch pipes 12 evenly.

Meanwhile, water is contained in blowby gas fed to the PCV chamber 15, and water separated from the blowby gas in the PCV chamber 15 is discharged to the surge tank 11 through the drain hole 17c and is fed to the combustion chamber for combustion through the branch pipes 12 together with intake gas. At this time, if the water discharged into the surge tank 11 flows backward to the upstream side, the throttle valve 13 connected to the surge tank 11 on the upstream side thereof gets wet, which may freeze the throttle valve 13 during low temperature and cause operational failure.

However, according to this embodiment, since the drain hole 17c of the PCV chamber 15 is located downstream of the most upstream protruding part 17e, water discharged in the surge tank 11 can be blocked by the most upstream protruding part 17e and prevented from flowing backward to the throttle valve 13 side. In addition, since a swirling current V2 (see FIG. 2) formed downstream of the most upstream protruding part 17e pushes the water to the downstream side of the surge tank 11, the throttle valve 13 can be reliably prevented from getting wet.

In addition, since the blowby gas exhaust port 16f of the PCV chamber 15 is located at a position higher than the blowby gas introduction port 16g, blowby gas flows upward inside the PCV chamber 15 and is discharged to the surge tank 11 through the blowby gas exhaust port 16f located at a high position, which prevents water retaining in a bottom part of the PCV chamber 15 from being dragged by the blowby gas and scattered into the internal space of the surge tank 11 through the blowby gas exhaust port 16f and thereby prevents the throttle valve 13 from getting wet further reliably.

The embodiment of the present invention has been described above; however, various design changes can be made to the present invention without departing from the gist of the present invention.

For example, the engine of the present invention is not limited to the inline four-cylinder engine of the embodiment; instead, it may be an inline multi-cylinder engine with a different number of cylinders, or alternatively may be another type engine such as a V-shaped multi-cylinder engine.

The invention claimed is:

1. An intake manifold for an engine, comprising:
a surge tank having a longitudinal direction which defines an upstream side and a downstream side of said surge tank, said surge tank being connected at the upstream side thereof to a throttle valve, said surge tank comprising
a plurality of branch pipes arranged side by side in the longitudinal direction and respectively connected to cylinders, and
a bottom wall having at least one protruding part that protrudes upward from the bottom wall, said at least one protruding part including the most upstream protruding part in the longitudinal direction located on the most upstream side; and
a PCV chamber disposed in said surge tank on the upstream side, which is upstream of a central part of said surge tank in the longitudinal direction, said PCV chamber comprising
a blowby gas introduction port configured to introduce blowby gas into said PCV chamber,
a blowby gas exhaust port configured to discharge the blowby gas from said PCV chamber into said surge tank, and
a drain hole configured to discharge water contained in the blowby gas from said PCV chamber into said surge tank, wherein
said blowby gas exhaust port is located upstream of the most upstream protruding part in the longitudinal direction, and
said drain hole is located downstream of the most upstream protruding part in the longitudinal direction.

2. The intake manifold for the engine according to claim 1, wherein said blowby gas exhaust port is located at a position higher than said blowby gas introduction port.

* * * * *